United States Patent [19]

Dinger et al.

[11] 4,428,192
[45] Jan. 31, 1984

[54] TURBOCHARGED INTERNAL COMBUSTION ENGINE

[75] Inventors: Hans Dinger, Friedrichshafen; Helmut Klotz, Tettnang, both of Fed. Rep. of Germany

[73] Assignee: MTU Friedrichshafen GmbH, Friedrichshafen, Fed. Rep. of Germany

[21] Appl. No.: 368,642

[22] Filed: Apr. 15, 1982

Related U.S. Application Data

[63] Continuation of Ser. No. 92,028, Nov. 7, 1979, abandoned.

[30] Foreign Application Priority Data

Nov. 16, 1978 [DE] Fed. Rep. of Germany ....... 2849723

[51] Int. Cl.³ ............................................. F02B 37/00
[52] U.S. Cl. ......................................... 60/606; 60/612
[58] Field of Search ................................... 60/606, 612

[56] References Cited

FOREIGN PATENT DOCUMENTS 2719668 11/1978 Fed. Rep. of Germany ........ 60/605
2838952  3/1980 Fed. Rep. of Germany ........ 60/612

Primary Examiner—Michael Koczo
Attorney, Agent, or Firm—Craig & Burns

[57] ABSTRACT

An internal combustion engine with several cylinders and with one or several supercharging aggregates, in which at partial load of the engine, some cylinders operate as engine while the remaining cylinders, operating in the meantime as compressor, supply compressed gas to the turbine of a further supercharging aggregate whose compressor is connected in series with the compressor of that supercharging aggregate which supplies the cylinders operating as engine with supercharging air.

21 Claims, 2 Drawing Figures

TURBOCHARGED INTERNAL COMBUSTION ENGINE

This is a continuation of application Ser. No. 092,028, filed Nov. 7, 1979, now abandoned.

The present invention relates to a supercharged multi-cylinder internal combustion engine in which, at partial load of the engine, some cylinders operate as engine while the remaining cylinders operate as compressor for supplying compressed gas, and the invention aims at the preparation of supercharging air with a high compression.

Different arrangements of internal combustion engines are known in the prior art which utilize compressed gas from cylinders operated temporarily as compressor as additional driving means for a supercharging aggregate which supplies cylinders, operating as an engine, with precompressed supercharging air. The energy content of the compressed gas from the cylinders operating as a compressor is dependent on the counter-pressure which results from the throttling effect of the compressed gas load or consuming device effecting the auxiliary drive. In the prior art arrangements, the throttle effect of the compressed gas load or consuming device is sufficiently large in the partial load operation only at high rotational speeds of the internal combustion engine in order to attain an effective supercharging pressure increase. This unfavorable operating behavior of the known arrangements results from the use of compressed gas loads or consuming devices which, in normal operation of the internal combustion engine, are operated with compressed gas of very high energy content and cannot be designed optimally to the conditions which obtain with a divided manner of operation of the internal combustion engine.

It is therefore the task of the present invention, for the purpose of preparing supercharging air with high precompression, to provide a compressed gas drive with a compressed gas load or consuming device whose throttling effect permits the production of compressed gas of high energy content already during idling of the internal combustion engine.

The underlying problems are solved according to the present invention in that the compressed gas is fed to a turbine of a further supercharging aggregate, whose compressor is connected in series with the compressor of that supercharging aggregate which supplies cylinders operating as engine with supercharging air. The turbine of the further supercharging aggregate can be designed and constructed specially to the requirements of the compressed gas drive in order to realize the desired precompression of the charging air within the required operating range of the internal combustion engine.

The advantages achieved with the present invention consist especially in that particularly favorable charging or supercharging conditions can be created for the internal combustion engine at idling and small partial loads, in that unequivocal thermodynamic conditions result for the design of the additional supercharging aggregate, in that with Diesel engines which are operated with low compression ratio, the pressure and temperature values required for a trouble-free operation can be attained with certainty in the cylinder, and in that the white smoke of the Diesel engine is avoided.

Accordingly, it is an object of the present invention to provide a supercharged multi-cylinder internal combustion engine, in which at partial load some cylinders are operated as engine while other cylinders are operated as compressor, which avoids by simple means the aforementioned shortcomings and drawbacks encountered in the prior art by extremely simple means.

Another object of the present invention resides in a supercharged multi-cylinder internal combustion engine, especially Diesel engine, which permits an effective supercharging pressure increase over the entire load range of the engine at substantially all rotational speeds thereof.

A further object of the present invention resides in an internal combustion engine of the type described above in which favorable supercharging conditions can be created already at idling and small partial loads while unequivocal thermodynamic conditions exist that permit the design and construction of the auxiliary supercharging aggregate for optimum operation.

A still further object of the present invention resides in a supercharged multi-cylinder Diesel engine of the type described above, operated with relatively low compression ratio, which permits the attainment of those pressure and temperature values in the cylinders with certainty and reliability that are necessary for a trouble-free operation.

Another object of the present invention resides in a Diesel engine of the type described above which effectively eliminates the danger of white smoke due to improper operating conditions thereof.

These and other objects, features and advantages of the present invention will become more apparent from the following description when taken in connection with the accompanying drawing which shows, for purposes of illustration only, one embodiment in accordance with the present invention, and wherein.

Figure 1:
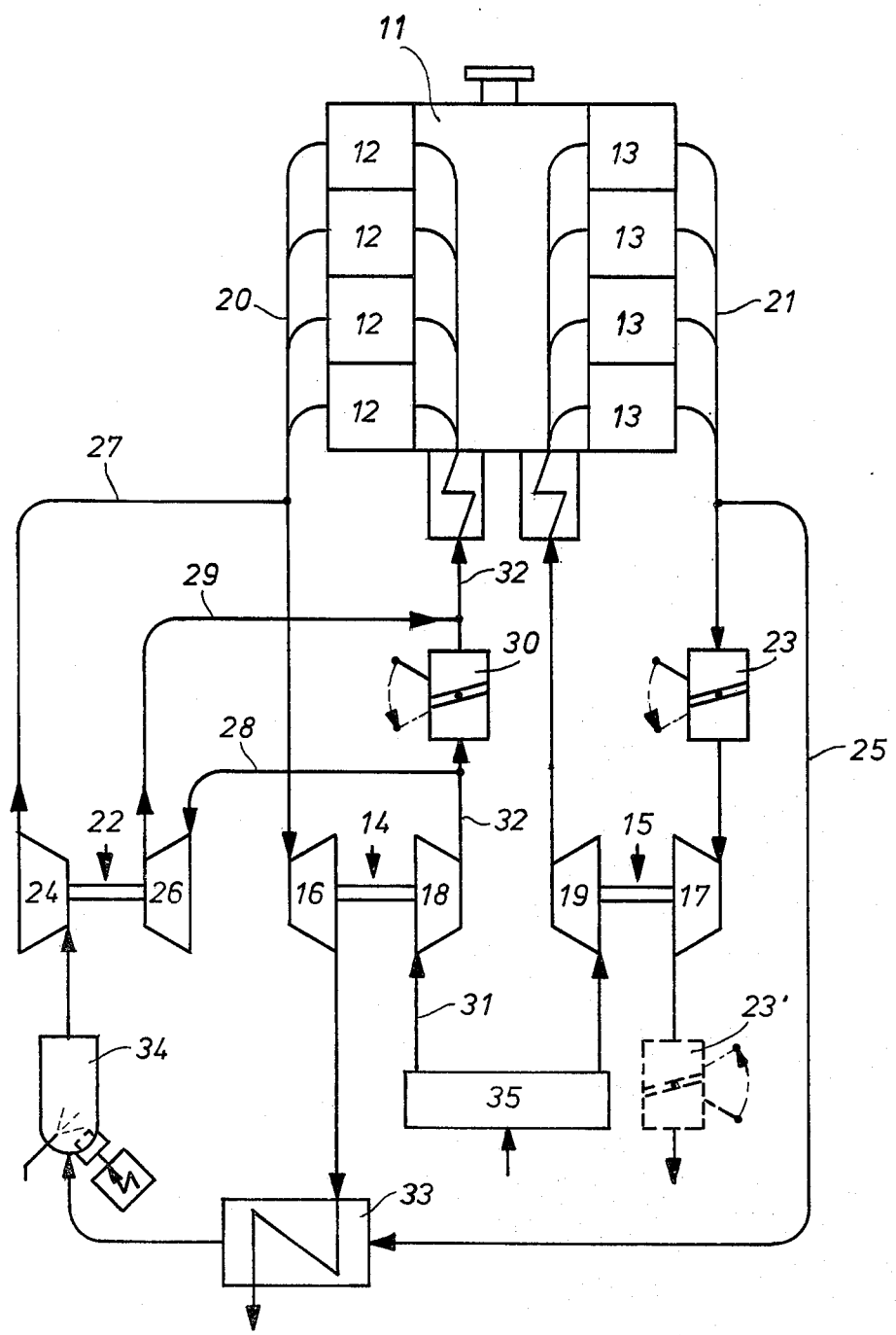
FIG. 1 is a schematic view of a supercharged multi-cylinder internal combustion engine in accordance with one embodiment of the present invention.
Figure 2:
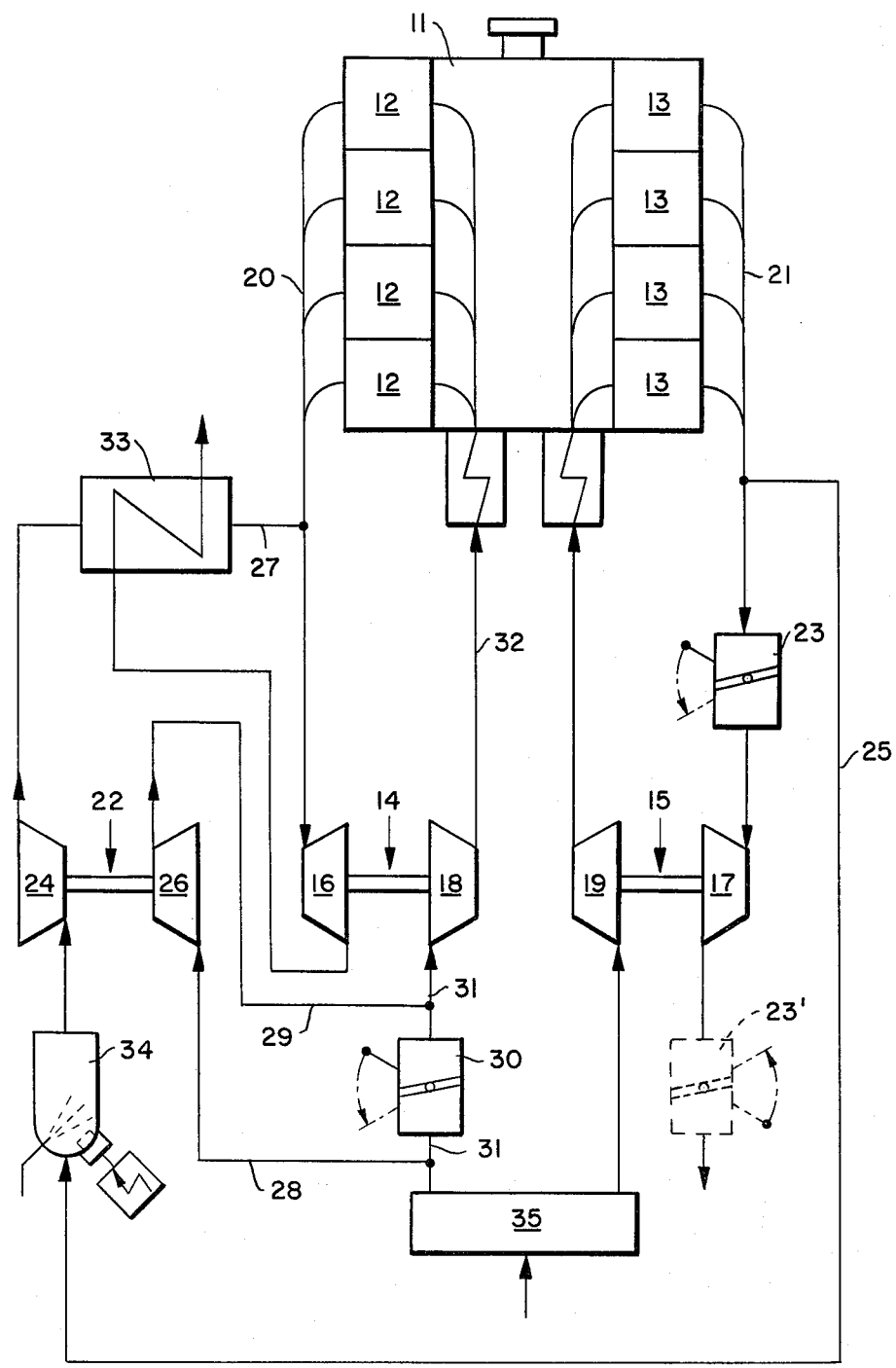
FIG. 2 is a schematic view of a second embodiment of the invention showing a different disposition of closure device and heat-exchanger.

Referring now to the drawings wherein like reference numerals are used in both views to designate like parts and, more particularly to FIG. 1, according to this figure, an internal combustion engine 11, with several cylinders 12 and 13 arranged in two rows, is supplied with precompressed charging air by two supercharging aggregates generally designated by reference numerals 14 and 15, therefor. Each of the aggregates 14, 15 respectively include an exhaust gas turbine 16 and 17 and of a compressor 18 and 19. At partial load of the internal combustion engine 11, only the cylinders 12 operate as engine, whereas the remaining cylinders 13 are operated as compressor. The compressed gas from the cylinders 13 reaches by way of the exhaust valves present in each cylinder 13 or by way of special compressed gas outlet valves (not shown) the exhaust gas line 21 which is closed against the atmosphere by a closure device 23, respectively, 23'. The compressed gas is fed by means of a compressed gas line 25 connected to the exhaust gas line 21 to the turbine 24 of a further supercharging aggregate generally designated by reference numeral 22. The compressor 26 thereof is connected in series with the compressor 18 of the supercharging aggregate 14 which supplies the cylinders 12 operating as engine with supercharging air. The suction line 28 and the pressure line 29 of the compressor 26 are thereby connected with the supercharging air line of the compressor 18 downstream, respectively, upstream of a closure device 30. A two-stage precompression of the supercharging air for the cylinders 12 results in this manner, whereby in principle two modifications are possible for the connections. In the one embodiment, the compressor 26 of the further supercharging aggregate 22 is used as low pressure stage and the compressor 18 of the supercharging aggregate 14 as high-pressure stage. As shown in FIG. 2, the closure device 30 and the connections for the suction and pressure line 28 and 29 are thereby disposed in the supercharging air suction line 31 of the compressor 18. However, the compressor 18 operates in that case under pressure and volume flow conditions which differ from the normal operation and displace its operating line into proximity of the pump limit. In order that the compressor 18 can function without trouble in this operating manner, either a compressor rotor with a wide performance graph or with an adjustable guide apparatus is necessary. However, these problems can be circumvented by the other modification which is shown in the illustrated embodiment. The sequence of the compressors is reversed in that case. The compressor 18 operates as in normal operation and sucks in air as low pressure stage out of the atmosphere by way of the filter 35, whereas the compressor 26 is used as high pressure stage. As a result thereof, no special construction is necessary for the compressor 18 and the compressor 26 can be optimally designed for the special application. With this embodiment, the closure device 30 and the connections of suction and pressure line 28 and 29 are arranged in the supercharging air pressure line 32 of the compressor 18.

Both the compressed gas line 25, 27 as also the suction and pressure line 28 and 29 from and to the further supercharging aggregate 22 are in constant open communication with the lines 20, 21 and 32, to which they are respectively connected. This arrangement is possible because in the normal operation of the internal combustion engine with an opened closure device 23, 23', no significant pressure difference exists either between the exhaust gas lines 20 and 21 or in the supercharging air pressure line 32 upstream or downstream of the closure device 30 disposed in the open position. As a result thereof, expensive closure devices in the lines 25, 27, 28 and 29, which require structural space, can be economized.

The exhaust gas from the turbine 24 of the further supercharging aggregate 22 is fed by way of line 27 to the exhaust gas of the cylinders 12 operating as engine ahead of the inlet into the exhaust gas turbine 16. The mass flow traversing the exhaust gas turbine 16 is increased thereby which increases the driving power for the compressor 18.

In order to further increase the energy content of the compressed gas for the turbine 24, a heating device is arranged in the compressed gas line 25 ahead of the turbine 24 of the further supercharging aggregate 22, by means of which the temperature of the compressed gas can be raised. An exhaust gas heat-exchanger is designated by reference numeral 33, which permits utilization of the residual heat of the exhaust gases from the exhaust gas turbine 16. The effectiveness of the compressed gas heating device can be considerably increased by the arrangement of an auxiliary combustion chamber 34 in the compressed gas line 25. Above all, the compressed gas heating device can be metered by means of the auxiliary combustion chamber 34. With the simultaneous use of an auxiliary combustion chamber 34 and of an exhaust gas heat-exchanger 33, it is appropriate to arrange the exhaust gas heat-exchanger 33 in the compressed gas line 25 upstream of the auxiliary combustion chamber 34.

However, it may also be appropriate to arrange the exhaust gas heat-exchanger 33 downstream of the turbine 24 in the line 27 as shown in FIG. 2, if the temperature level of the two exhaust gas streams permits the same and the auxiliary combustion chamber 34 is dispensed with.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:
1. An internal combustion engine, comprising
several cylinder means having input and output line means,
means for supercharging comprising at least one supercharging aggregate, each supercharging aggregate comprising an exhaust gas turbine means and a compressor means,
means for causing at partial load of the engine some cylinder means to operate as an engine and other cylinder means to operate in the meantime as a compressor for supplying compressed gas,
further means for supercharging comprising a further supercharging aggregate characterized in that the compressed gas is fed to a turbine means thereof, wherein
the exhaust gas from the turbine means of the further supercharging aggregate is fed to the exhaust gas from the cylinder means operating as an engine and thence into an exhaust gas turbine means of said means for supercharging.

2. An internal combustion engine according to claim 1, characterized in that a compressor means of said further supercharging aggregate is series-connected with the compressor means of that supercharging aggregate which supplies the cylinder means operating as engine with supercharging air.

3. An internal combustion engine according to claim 1, characterized in that a
means for closure is arranged in a means for providing supercharging air of that supercharging aggregate which supplies the cylinder means operating as an engine with precompressed supercharging air.
means for providing suction and means for providing pressure at the compressor means of the further supercharging aggregate being connected respectively upstream and downstream of the means for closure.

4. An internal combustion engine according to claim 3, characterized in that the
means for closure is arranged in means for providing supercharging air pressure of the compressor means of the supercharging aggregate supplying the cylinder means operating as engine with supercharged air.

5. An internal combustion engine according to claim 3, characterized in that the means for closure is arranged in means for providing supercharging air suction of the compressor means of the supercharging aggregate supplying the cylinder means operating as engine with supercharged air.

6. An internal combustion engine according to claim 1, further comprising
means for providing heat transfer to the compressed gas upstream of the turbine means of the further supercharging aggregate.

7. An internal combustion engine according to claim 1, characterized in that
means for providing heat transfer to the compressed gas is arranged in the exhaust line means downstream of the turbine means of the further supercharging aggregate.

8. An internal combustion engine according to claim 7, characterized in that
means for providing exhaust gas heat exchange is provided which, for the purpose of heat transfer to the compressed gas, is traversed by the exhaust gas from the exhaust gas turbine means of the supercharging aggregate supplying the cylinder means operating as engine with supercharged air.

9. An internal combustion engine according to claim 8, characterized by
means for providing heat comprising an auxiliary combustion chamber arranged to transmit heat to the compressed gas.

10. An internal combustion engine according to claim 9, characterized in that a
means for closure is arranged in the means for providing supercharging air of that supercharging aggregate which supplies the cylinder means operating as engine with precompressed supercharging air,
the connections of a means for providing suction and a means for providing pressure of the compressor means of the further supercharging aggregate being disposed respectively upstream and downstream of the means for closure.

11. An internal combustion engine according to claim 1, further comprising
a means for providing heat transfer to the compressed gas upstream of the turbine means of the further supercharging aggregate from an output of an exhaust gas turbine means of the means for supercharging.

12. An internal combustion engine according to claim 1, further comprising
a means for providing heat transfer to the compressed gas arranged in the exhaust line means downstream of the turbine means of the further supercharging aggregate from an output of an exhaust gas turbine means of the means for supercharging.

13. An internal combustion engine according to claim 1 or 12, characterized in that
means for providing exhaust gas heat exchange is provided which, for the purpose of heat transfer to the compressed gas, is traversed by the exhaust gas from the exhaust gas turbine means of the supercharging aggregate supplying the cylinder means operating as engine with supercharged air.

14. An internal combustion engine according to claim 1 or 12, characterized in that
means for providing heat comprising an auxiliary combustion chamber is arranged in the means for providing compressed gas.

15. An internal combustion engine according to claim 14, characterized in that
means for providing exhaust gas heat exchange is provided which, for the purpose of heat transfer to the compressed gas, is traversed by the exhaust gas from the exhaust gas turbine means of the supercharging aggregate supplying the cylinder means operating as engine with supercharged air.

16. An internal combustion engine according to claim 1, characterized in that a
means for closure is arranged in a means for providing supercharging air of that supercharging aggregate which supplies the cylinder means operating as an engine with precompressed supercharging air, and
connections of a means for providing suction and a means for providing pressure of the compressor means of the further supercharging aggregate being disposed respectively upstream and downstream of the means for closure.

17. An internal combustion engine according to claim 16, characterized in that the
means for closure is arranged in a means for providing supercharging air pressure of the compressor means of the supercharging aggregate supplying the cylinder means operating as engine with supercharged air.

18. An internal combustion engine according to claim 16, characterized in that the
means for closure is arranged in a means for providing supercharging air suction of the compressor means of the supercharging aggregate supplying the cylinder means operating as engine with supercharged air.

19. An internal combustion engine according to claim 1, characterized in that
a means for providing heat transfer to the compressed gas is arranged in a means for providing compressed gas upstream of the turbine means of the further supercharging aggregate, wherein
means for providing exhaust gas heat exchange is provided which, for the purpose of heat transfer to the compressed gas, is traversed by the exhaust gas from the exhaust gas turbine means of the supercharging aggregate supplying the cylinder means operating an engine with supercharged air.

20. An internal combustion engine according to claim 19, charcterized in that
means for providing heat comprising an auxiliary combustion chamber is arranged in the means for providing compressed gas.

21. An internal combustion engine according to claim 20, characterized in that
a means for closure is arranged in the means for providing supercharging air of that supercharging aggregate which supplies the cylinder means operating as an engine with precompressed supercharging air,
the connections of a means for providing suction and a means for providing pressure of the compressor means of the further supercharging aggregate being disposed respectively upstream and downstream of the means for closure.

* * * * *